(12) United States Patent
Falik

(10) Patent No.: US 7,170,275 B1
(45) Date of Patent: Jan. 30, 2007

(54) METHOD AND APPARATUS FOR DETERMINING THE TEMPERATURE OF A JUNCTION USING VOLTAGE RESPONSES OF THE JUNCTION AND A CORRECTION FACTOR

(75) Inventor: Ohad Falik, Kfar Saba (IL)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/085,828

(22) Filed: Mar. 21, 2005

Related U.S. Application Data

(63) Continuation of application No. 10/301,831, filed on Nov. 21, 2002, now Pat. No. 6,870,357.

(51) Int. Cl.
*G01R 31/02* (2006.01)
*G01R 27/02* (2006.01)
*G01N 27/00* (2006.01)

(52) U.S. Cl. .................. 324/71.5; 324/158.1; 324/685; 324/721; 324/760; 327/83; 327/371; 327/512; 374/172; 374/178

(58) Field of Classification Search ............. 324/71.5, 324/760; 327/83, 371, 378, 512; 374/172, 374/178
See application file for complete search history.

(56) References Cited

U.S. PATENT DOCUMENTS

| | | | |
|---|---|---|---|
| 4,052,744 A | 10/1977 | Boothman et al. | |
| 4,150,433 A | 4/1979 | Kaniel | |
| 6,008,685 A * | 12/1999 | Kunst | 327/512 |
| 6,452,454 B1 * | 9/2002 | Shapiro et al. | 330/289 |
| 6,554,469 B1 * | 4/2003 | Thomson et al. | 374/178 |
| 6,612,738 B2 | 9/2003 | Beer et al. | |

\* cited by examiner

*Primary Examiner*—Vinh Nguyen
*Assistant Examiner*—Emily Y Chan

(57) ABSTRACT

Method and system for periodically measuring the junction temperature of a semiconductor device. The junction is excited by at least two sequential predetermined currents of different magnitudes. The voltage response of the junction to the at least two currents is measured and the temperature of the junction is calculated, while substantially canceling ohmic effects, by using the voltage response and a correction factor. Whenever desired, the junction is excited by a set of at least four sequential different currents having known ratios. The voltage response to the set is measured and the correction factor is calculated by using each voltage response to the set.

9 Claims, 3 Drawing Sheets

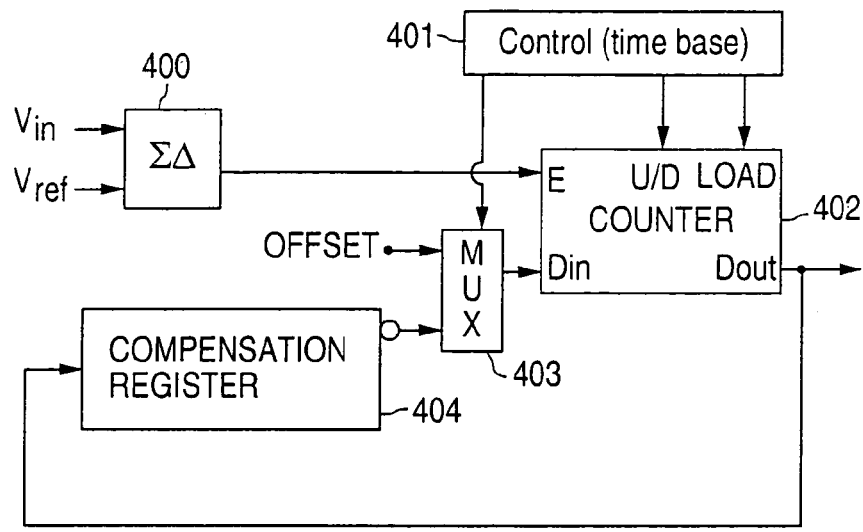
FIG. 4A
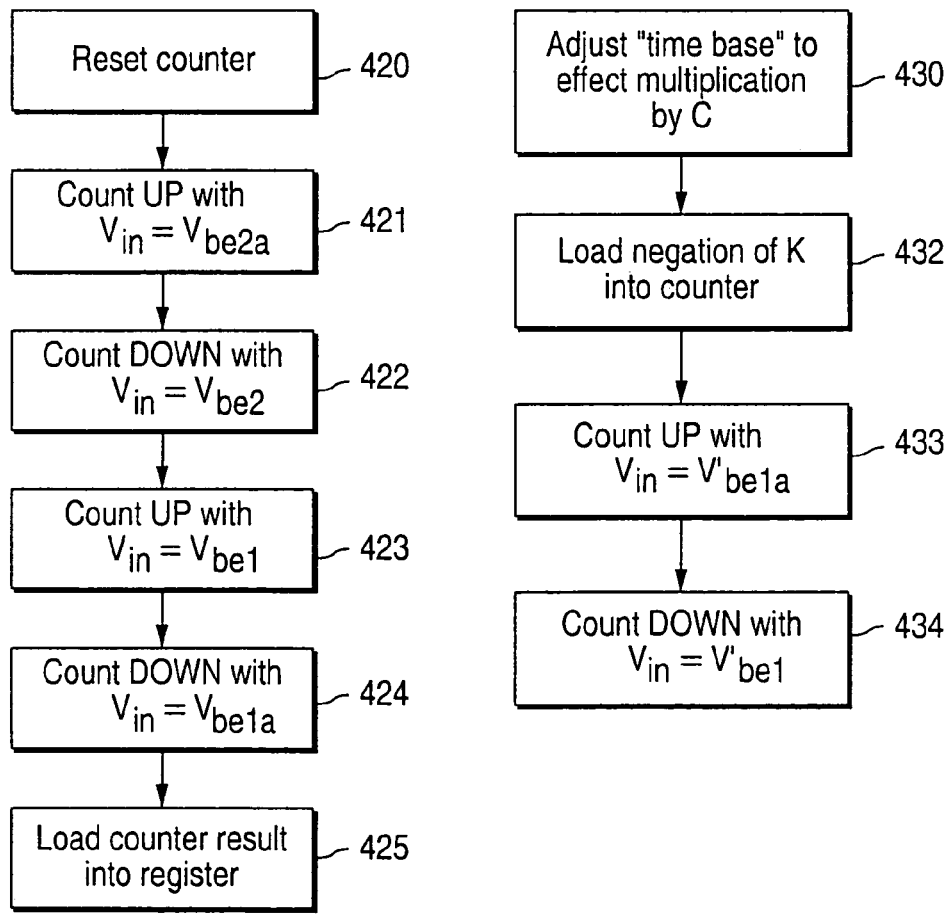
FIG. 4B  FIG. 4C

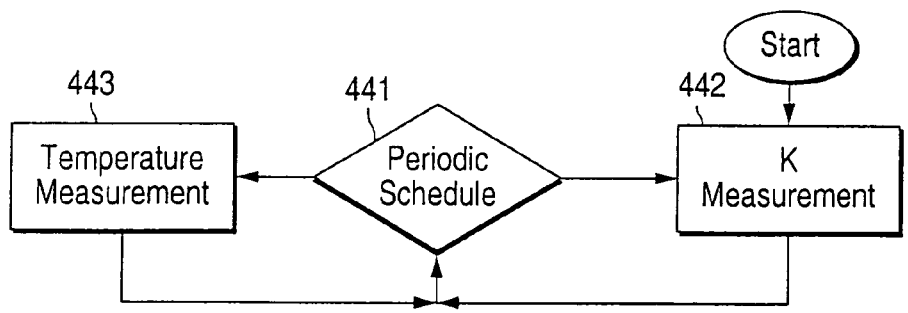
FIG. 4D
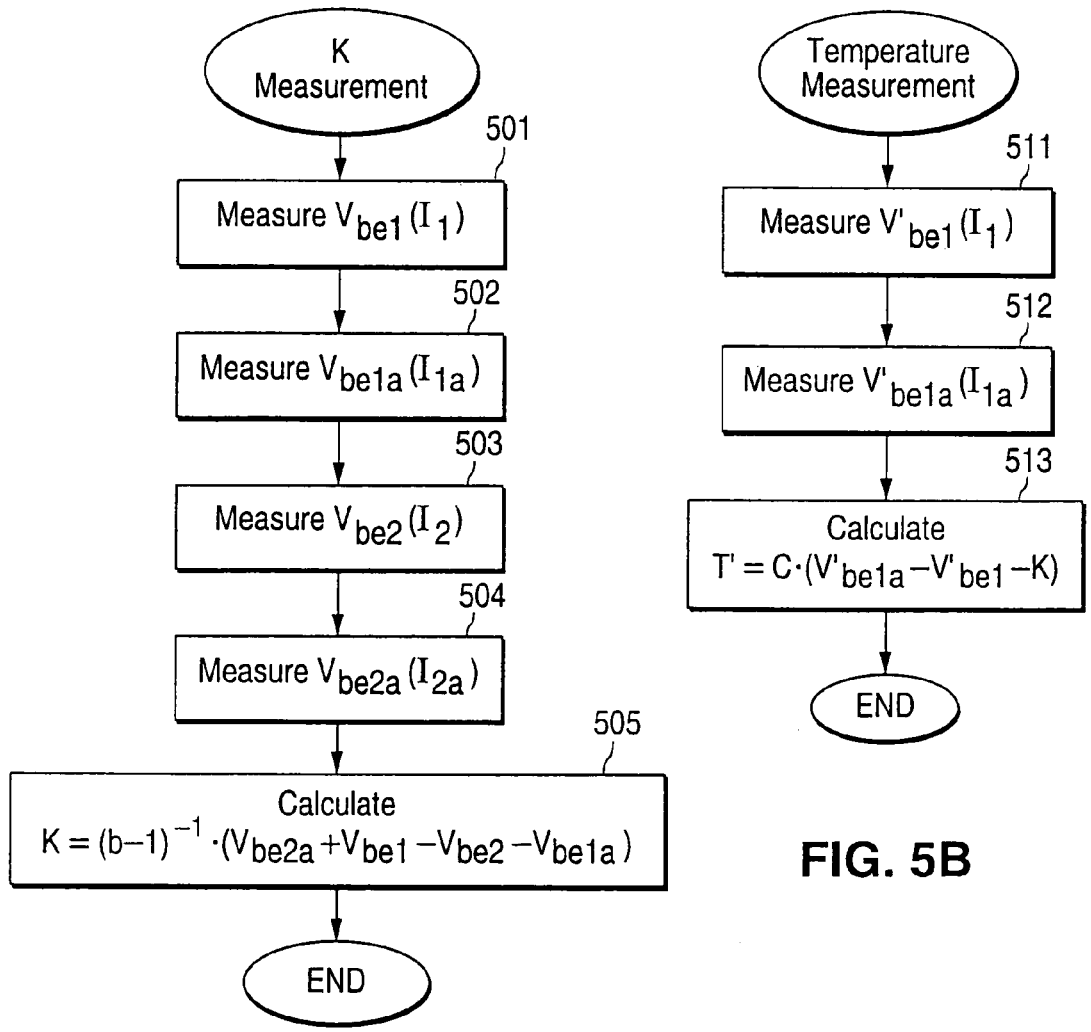
FIG. 5A
FIG. 5B

METHOD AND APPARATUS FOR DETERMINING THE TEMPERATURE OF A JUNCTION USING VOLTAGE RESPONSES OF THE JUNCTION AND A CORRECTION FACTOR

This application is a continuation of prior U.S. patent application Ser. No. 10/301,831 filed Nov. 21, 2002, now U.S. Pat. No. 6,870,357.

TECHNICAL FIELD OF THE INVENTION

The present invention relates generally to the field of temperature measurement in semiconductor circuitry, and, more particularly, to a method and apparatus for determining the temperature of a semiconductor junction utilizing a correction factor to eliminate the effects of parasitic Ohmic resistances.

BACKGROUND OF THE INVENTION

In many applications there is a need to keep an operating system within predefined temperature ranges. A common type of temperature sensing device used for this task is known as a "contact device," which is relatively inexpensive and can be used to accurately measure temperature. A contact device operates in direct contact with a measured object. In this way, the contact device senses the temperature of the object thereby generating a temperature measurement can be obtained.

One type of contact device temperature sensor is based on a semiconductor junction (usually Silicon or Germanium), which can be compactly packaged as a small temperature sensor. The temperature measurement in such devices is based on the strong temperature dependency of the electrical current and voltage of the semiconductor junction. This type of temperature measurement is particularly attractive in integrated circuits ("IC") in which the sensing device is usually implemented by a bipolar transistor integrated into the semiconductor substrate.

A typical measurement array, based on a semiconductor junction device, is illustrated in FIG. 1. Current source 110 input and the voltage over the base (b) emitter (e) junction of bipolar transistor 100 are utilized for temperature measurement. The forward current $I_f$ and forward voltage $V_f$ of a semiconductor junction, are related by the Ebers-Moll relationship (also known as the Shockley equation):

$$I_f = I_s \cdot \left(e^{\frac{V_f}{\eta \cdot V_t}} - 1\right) \xrightarrow{V_f \gg V_t} I_s \cdot e^{\frac{V_f}{\eta \cdot V_t}}$$

where Is is the junction saturation current, $\eta$ is an ideality factor (emission coefficient), and $V_t$ is the junction Thermal Voltage. The Thermal Voltage can be determined according to the junction temperature by the following rule:

$$V_t = \frac{k \cdot T}{q},$$

where k is Boltzmann's constant, q is the electron charge, and T is the junction temperature (K°). Since the forward junction current $I_f$ is constant, the junction temperature may be determined by measuring the forward junction voltage $V_f$ and by computing $$V_t V_f \cdot \left(\eta \cdot \ln \frac{I_f}{I_s}\right)^{-1}.$$

The junction temperature T can then be calculated from $$T = \frac{q \cdot V_t}{k}.$$

However, due to parasitic effects (e.g., contact resistance), a precise measurement of the junction forward voltage $V_f$ can not be obtained. In fact, the closest measurement of the junction forward voltage can be obtained via the b and e terminals, $V_{be}$, of bipolar transistor 100. The Ohmic resistances $r_c$, $r_b$, and $r_e$, illustrated in FIG. 1, are the main obstacle in obtaining an accurate measurement of the forward voltage $V_f$ of the junction.

One method to solve this problem is described in U.S. Pat. No. 5,195,827, where the effect of the Ohmic resistances is eliminated by carrying out a sequence of three voltage measurements corresponding to three different forward currents ($I_{f1}$, $I_{f2}$, and $I_{f3}$). While this method improves the result of the temperature measurement, a significant computation effort (involving log operations) is required for each sequence of measurements to obtain the temperature measurement. Therefore, a central processor is utilized in this device for automatic excitation and temperature calculation. In addition, the computation performed in this method requires that the ratios between the different three forward currents will be substantially large, and a possible embodiment of a current source suggests utilizing three resistors of different resistance values supplied by a common voltage.

The aforementioned drawbacks lead to inaccuracies in the temperature measurement. In addition, using the computation method results in a temperature offset of about one-half (½) of a degree in the calculated temperature.

A temperature measurement application that uses two current sources for measuring the temperature on diode based devices is disclosed in National Semiconductor publication "*Design Consideration for PC Thermal Management*". The method described in this publication uses two currents of different magnitudes (x1 and x10) to excite the diode junction. This application however does not provide any way to eliminate Ohmic effects.

SUMMARY OF THE INVENTION

To address the above-discussed deficiencies of the prior art, it is an object of the present invention to provide a method and apparatus for measuring the temperature of a semiconductor junction based on a pre-calculated correction factor. Other objects of the present invention are to provide a method and apparatus that (i) substantially reduces the computational effort involved in a temperature measurement of a semiconductor junction, (ii) measures the temperature of a semiconductor junction that is based on a pre-calculated correction factor and the voltage measurements that correspond to the input of two adjacent forward currents, (iii) measures the temperature of a semiconductor junction in which the ratio of the applied forward input currents is relatively small, and (iv) measure temperature of a semiconductor junction accurately and quickly enough to cancel the impacts of resistive parasitic elements in the current loop. Other objects and advantages of the invention will become apparent as the description proceeds.

The present invention is directed to a method and system for periodically measuring the junction temperature of a semiconductor device. According to one advantageous embodiment of the invention, the temperature of the semiconductor junction is measured by exciting the junction by at least two sequential predetermined currents of different magnitudes, measuring the voltage response of the junction to the at least two currents, and calculating the temperature of the junction, while substantially canceling Ohmic effects by using the voltage response and a correction factor obtained by periodically (or whenever desired) performing the following steps:

exciting the junction by a set of at least four sequential different currents having known ratios;
measuring the voltage response to the set of currents; and
calculating the correction factor by using each voltage response to the set of currents.

According to another preferred embodiment of the invention the ratios of the first $I_1$ and second $I_{1a}$ currents, the first $I_1$ and third $I_2$ currents, and the second $I_{1a}$ and fourth $I_{2a}$ currents of the sequential different currents are fixed and predetermined. The ratio of the first $I_1$ and third $I_2$ currents preferably equals to $I_1/I_2=2$, and the ratio $I_1/I_{1a}$ of the first and second currents preferably equals to the ratio $I_1/I_{2a}$ of the third and fourth currents. The ratio of the first and second currents and the ratio of the third and fourth currents preferably equals to $I_1I_{1a}=I_2/I_{2a}=10$.

According to one preferred embodiment of the invention the at least two sequential predetermined currents equals to the first $I_1$ and second $I_{1a}$ currents. The correction factor K is preferably obtained by the subtraction of a first voltage difference $$\Delta V_2 = V(I_{1a}) - V(I_1)$$

from a second voltage difference $$\Delta V_2 = V(I_{2a}) - V(I_2),$$

where the second voltage difference is the voltage difference of the voltage measurements corresponding to the fourth and third currents, and where the first voltage difference is the voltage difference of the voltage measurements corresponding to the second and first currents. This way the junction temperature T' can be obtained by subtracting the correction factor K from the voltage difference $V(I_{1a})-V(I_1)$ of the voltage measurements corresponding to the at least two sequential predetermined currents, and by multiplying the subtraction result by a fixed constant $$T' = C \cdot (V(I_1) - V(I_1) - K).$$

The correction factor K can be obtained by multiplying the subtraction result obtained by subtracting a first voltage difference $$\Delta V_2 = V(I_{1a}) - V(I_1)$$

from a second voltage difference $$\Delta V_2 = V(I_{2a}) - V(I_2)$$

by a predetermined constant, where the second voltage difference is the voltage difference of the voltage measurements corresponding to the fourth and third currents, the first voltage difference is the voltage difference of the voltage measurements corresponding to the second and first currents, and where the predetermined constant corresponds to the ratio of the first $I_1$ and third $I_2$ currents.

The invention may further comprise a current generator capable of producing at least four sequential different currents. The current generator may be comprised of: a current source for providing a fixed current $I_{ref}$; a first current mirror stage comprising a set of switched current mirror circuitries each of which is capable of mirroring the current produced by the current source; and a second current mirror stage comprising a set of switched current mirror circuitries each of which is capable of mirroring the total current produced by the first current mirror stage, wherein the current $n \times r \times I_{ref}$ produced by the current generator equals to the multiplication of the fixed current source ($I_{ref}$) by the number (r) of current mirror circuitries switched ON in the first current mirror stage multiplied by the number (n) of current mirror circuitries switched ON in the second current mirror stage.

According to yet another preferred embodiment of the invention the temperature measurement of the semiconductor junction also comprises: providing an analog to digital-converter capable of receiving a measured voltage input and a reference voltage input, and outputting a sequence of pulse signals with a rate proportional to the ratio between the measured and reference voltages; providing a counter capable of performing UP and DOWN count, triggered by the pulse signals emanating from the analog to digital converter, staring from an initial value obtained via an input terminal, and capable of outputting the count result via output terminal; providing a storage device capable of storing the value being outputted via the output terminal, and capable of outputting an inverted value of its content; providing a selector device for selecting the value introduced on the input terminal, the value being a value obtained from the storage device or an external value for adjusting measurements results; and providing a control unit capable of controlling the selector device to determine which value is being selected,, determining whether UP or DOWN count is performed by the counter, instructing the counter to load a value via the input terminal, and determining a time base for each count operation performed by the counter. The term "selector," as used herein, refers to a device that, by utilizing a control signal, is capable of selecting one output signal from a plurality of input signals.

This way the correction factor K can be obtained by:
resetting the content of the counter;
providing on the measured voltage input of the analog to digital converter the junction voltage $V(I_{2a})$ corresponding to the fourth current and performing UP count by the counter;
providing on the measured voltage input of the analog to digital converter the junction voltage $V(I_2)$ corresponding to the third current and-performing DOWN count by the counter;
providing on the measured voltage input of the analog to digital converter the junction voltage $v(I_1)$ corresponding to the first current and performing UP count by the counter; and
providing on the measured voltage input of the analog to digital converter the junction voltage $V(I_{1a})$ corresponding to the fourth current and performing DOWN count by the counter.

With this result the junction temperature T' is obtained by performing the following steps:
a) loading into the counter the inversion of the correction factor stored in the storage device;

b) providing on the measured voltage input of the analog to digital converter the junction voltage $V(I_{1a})$ corresponding to the second current and performing UP count by the counter; and c) providing on the measured voltage input of the analog to digital converter the junction voltage $V(I_1)$ corresponding to the first current and performing DOWN count by the counter.

The external value introduced on the input terminal of the counter via the selector device can be used to convert the temperature measurement from degrees Kelvin to degrees Centigrade. Optionally, the correction factor is obtained once within a predetermined period of time, or alternatively, after a predetermined number of temperature measurements are performed.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 4a illustrates a block diagram of circuitry for obtaining a temperature measurement according to a preferred embodiment of the invention;

FIGS. 4b and 4c provide flow diagrams illustrating an exemplary process for calculating a correction factor and the junction temperature, illustratively using the apparatus of FIG. 4a, according to the present invention;

FIG. 4d provides a flow diagram illustrating an exemplary process for measuring a correction factor, and the semiconductor junction according to the present invention; and FIGS. 5a and 5b provide flow diagrams illustrating a process for calculating a correction factor and the junction temperature according to the present invention.

DETAILED DESCRIPTION OF PREFERRED EMBODIMENTS

The present invention provides a fast and accurate method for obtaining temperature measurement of a semiconductor junction. According to a preferred embodiment of the invention, a correction factor is calculated to enable an accurate computation of the junction temperature. The computation of the correction factor involves four voltage measurements, and the temperature measurement performed thereafter requires only two voltage measurements of the junction. Thus, with this method junction temperature is obtained by utilizing less voltage measurements, and less computation efforts, per measurement, in comparison with prior art methods. As will be explained in details hereinafter, these advantages can be further exploited to develop simplified temperature measurement devices.

Figure 1:
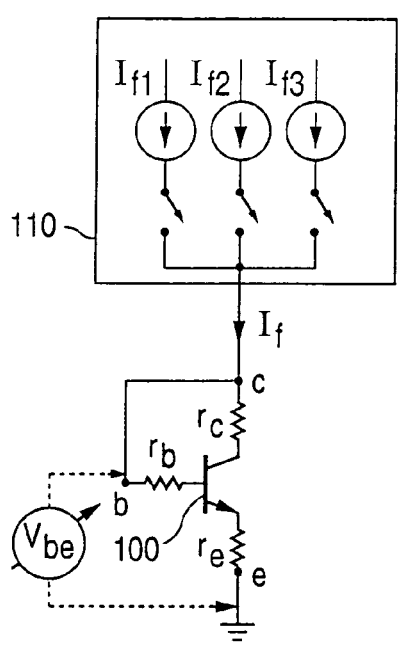
FIG. 1 illustrates a prior art implementation for measuring temperature of a semiconductor junction.
Figure 2:
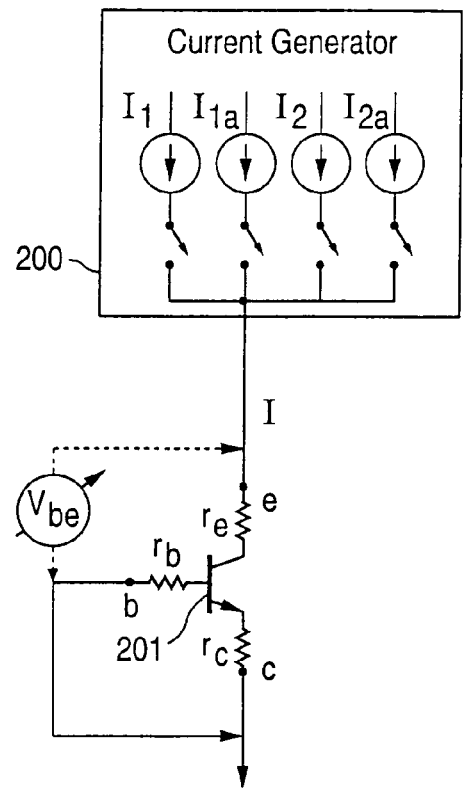
FIG. 2 illustrates a preferred implementation for a measurement array according to the present invention.

FIG. 2 illustrates a measurement array, in which current generator 200 is used to generate forward currents of four different magnitudes $I=I_1, I_{1a}, I_2,$ or $I_{2a}$. The currents magnitudes produced by the current generator are set to give the following ratios:

$$\frac{I_{1a}}{I_1} = \frac{I_{2a}}{I_2} = a \ (I_1 \neq I_2), \text{ and } \frac{I_2}{I_1} = b.$$

The voltage measured over the base emitter junction ($V_{be}$) which corresponds to the input of each of these currents, and the given currents ratios, are used for the computation of a correction factor, which is then used to facilitate the temperature measurements of the semiconductor junction.

The calculation of the correction factor is carried out utilizing the measured voltages $V_{be1}, V_{be1a}, V_{be2},$ and $V_{be2a}$, which corresponds to the forward current inputs $I_1, I_{1a}, I_2,$ and $I_{2a}$, respectively. After the voltage measurements are obtained, the Ebers-Moll relationship is utilized to calculate the correction factor. A process for calculating the correction factor (K) is illustrated in FIG. 5A. In steps 501 to 504 the voltage over the semiconductor junction ($V_{be1}(I_1), V_{be1a}(I_{1a}), V_{be2}(I_2)$ and $V_{be2a}(I_{2a})$) is measured.

In general, the base-emitter voltage can be expressed by the Ebers-Moll relationship as follows:

$$V_{be} = I_e \cdot r_e + (1-\alpha) \cdot I_e \cdot r_b + \eta \cdot V_t \cdot lan\frac{I_e}{I_s} = I_e \cdot R_{eq} + \eta \cdot V_t \cdot lan\frac{I_e}{I_s} \quad (I)$$

where $$R_{eq} = r_e + (1-\alpha) \cdot r_b.$$

The current gain $$\alpha = \frac{I_c}{I_e}$$

is used in this computation to express the base current $$I_b = (1-\alpha) \cdot I_e$$

in terms of the input current $$I = I_e.$$

Thus, by applying the above mentioned input currents $I_1, I_{1a}, I_2,$ and $I_{2a}$, the following voltage measurements are obtained:

$$V_{be1} = I_1 \cdot R_{eq} + \eta \cdot V_t \cdot lan\frac{I_1}{I_s}, \quad (II)$$

$$V_{be1a} = I_{1a} \cdot R_{eq} + \eta \cdot V_t \cdot lan\frac{I_{1a}}{I_s},$$

$$V_{be2} = I_2 \cdot R_{eq} + \eta \cdot V_t \cdot lan\frac{I_2}{I_s},$$

$$V_{be2a} = I_{2a} = I_{2a} \cdot R_{eq} + \eta \cdot V_t \cdot lan\frac{I_{2a}}{I_s}$$

these measured voltages are then used to compute the voltage differences $\Delta V_1$ and $\Delta V_2$, as follows:

$$\Delta V_1 = V_{be1a} - V_{be1} = R_{eq} \cdot (I_{1a} - I_1) + \eta \cdot V_t \cdot \left(lan\frac{I_{1a}}{I_s} lan\frac{I_1}{I_s}\right), \quad (III)$$

$$\Delta V_2 = V_{be2a} - V_{be2} = R_{eq} \cdot (I_{2a} - I_2) + \eta \cdot V_t \cdot \left(lan\frac{I_{2a}}{I_s} lan\frac{I_2}{I_s}\right)$$

by using the currents ratios $$\frac{I_{1a}}{I_1} = \frac{I_{2a}}{I_2} = \alpha$$

these expressions can be simplified to read:

$$\Delta V_1 = R_{eq} \cdot I_1 \cdot (a-1) + \eta \cdot V_t \cdot lan(a) \quad (IV)$$

$$\Delta V_2 = R_{eq} \cdot I_2 \cdot (a-1) + \eta \cdot V_t \cdot lan(a)$$

the correction factor K can be now obtained by subtracting the expressions in (IV) $\Delta V_2 - \Delta V_1$, and using the currents ratio $$\frac{I_2}{I_1} = b:$$

$$\Delta V_2 - \Delta V_1 = R_{eq} \cdot I_1 \cdot (a-1) \cdot (b-1)$$

$$K = R_{eq} \cdot I_1 \cdot (a-1) = \frac{\Delta V_2 - \Delta V_1}{(b-1)}. \quad (V)$$

The process of calculating the correction factor is completed in step 505 (FIG. 5A), wherein the correction factor $$K=(b-1)^{-1} \cdot (V_{be2a}+V_{be1}-V_{be2}-V_{be1a})$$

is calculated. In the preferred embodiment of the invention the current ratio is chosen to be $$\frac{I_2}{I_1} = b = 2,$$

and accordingly the computation of the corrector factor, performed in step 505, is reduced to $$K=V_{be2a}+V_{be1}-V_{be2}-V_{be1a}.$$

Once the correction factor is computed, the temperature T' of the semiconductor junction can be determined by inputting two current magnitudes $I_1$ and $I_{1a}$, having a predetermined ratio $$\frac{I_{1a}}{I_1} = a,$$

as shown in FIG. 5B. In this process the voltage over the semiconductor junction ($V'_{be1}(I_1)$ and $V'_{be1a}(I_{1a})$) is measured in steps 511 and 512. The base-emitter voltages obtained corresponds to the currents $I_1$ and $I_{1a}$ through the junction, $$V'_{be1} = I_1 \cdot R_{eq} + \eta \cdot V'_t \cdot lan\frac{I_1}{I_s},$$

$$V'_{be1a} = I_{1a} \cdot R_{eq} + \eta \cdot V'_t \cdot lan\frac{I_{1a}}{I_s},$$

and can now be used to compute the junction temperature as follows: $\Delta V'_1 = V'_{be1} = R_{eq} \cdot I \cdot (a-1) + \eta \cdot V'_1 lan(a) = K + \eta \cdot V'_1 \cdot lan(a)$ $$V'_t = \frac{(\Delta V'_1 - K)}{\eta \cdot lan(a)}$$

$$T' = \frac{q}{k \cdot \eta \cdot lan(a)} \cdot (\Delta V'_1 - K) = C \cdot (\Delta V'_1 - K) \quad (VI)$$

where $$C = \frac{q}{k \cdot \eta \cdot lan(a)}$$

is a pre-calculated constant.

Figure 3:
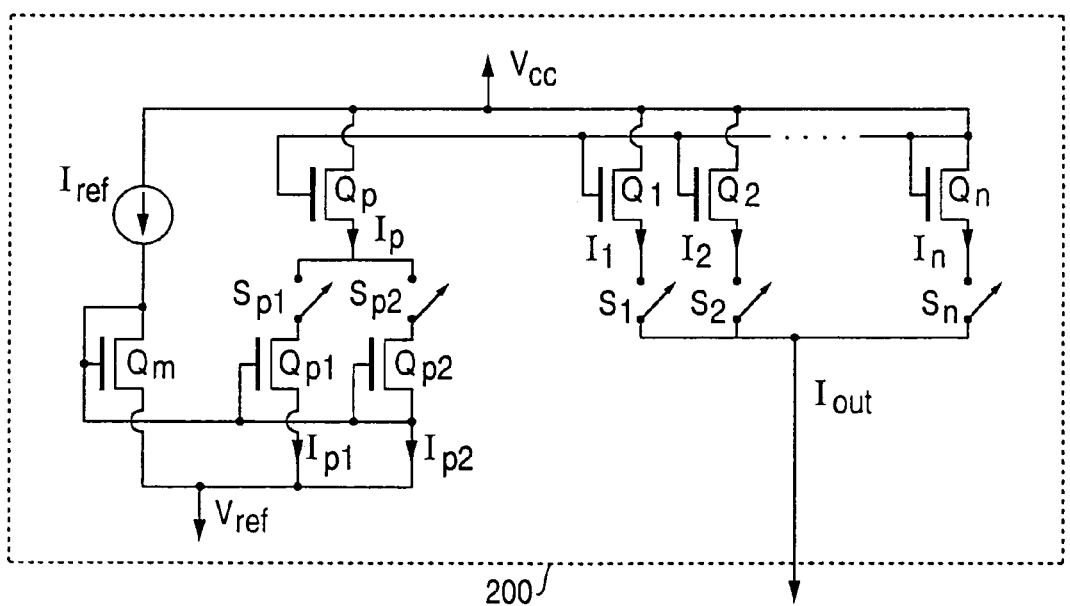
FIG. 3 illustrates a preferred implementation of a current generator according to the present invention.

FIG. 3 illustrates a preferred embodiment of the current source 200, according to the invention. As will be explained below, this current source embodiment is specially designed to produce four different currents with predetermined ratios, which are required to obtain a correction factor and temperature measurements. The current source 200 consists from a first mirror stage $Q_{p1}$ and $Q_{p2}$, and a second mirror stage $Q_1, Q_2, \ldots, Q_{10}$.

The operation of the current generator 200 is based on forcing a desired current by utilizing transistors current mirrors. For instance, the currents $I_{p1}$ and $I_{p2}$ through each of the first mirror stage ($Q_{p1}$ and $Q_{p2}$), when the switching devices $S_{p1}$ and $S_{p2}$ are in their "short" state (i.e., when they are closed), is actually the current mirrored by transistor $Q_m$, $$I_{p1}=I_{p2}=I_{ref}.$$

Consequently, the current through $Q_p$ ($I_p$), is determined according to the state of the switching devices, $S_{p1}$ and $S_{p2}$.

$$I_p = \begin{cases} I_{ref} & S_{p1} \text{ or } S_{p2} \text{ closed} \\ b \times I_{ref} & S_{p1} \text{ and } S_{p2} \text{ closed} \end{cases}$$

where the current ratio b is 2, if $Q_{p1}$ and $Q_{p2}$ are identical (b=2).

It should be noted that theoretically this mirror current scheme can be used to obtain a current $$I_p = r \times I_{ref}$$

(for some integer r) by using r current mirrors $Q_{p1}$, $Q_{p2}$, $Q_{p3}$, ..., $Q_{pr}$ in the first mirror stage.

Similarly, the currents $I_1$, $I_2$, ..., $I_n$, in the second mirror stage (through $Q_1$, $Q_2$, ..., $Q_n$), is the current mirrored by $Q_p$ ($I_p$). Therefore, when all of the switching devices $S_1$, $S_2$, ..., $S_n$, are in their short state, the current produced by the current generator 200 is $$I_{out}=I_1+I_2+\ldots+I_n=n \times I_p$$

(assuming that $Q_1$ to $Q_n$ are identical). And when $S_{p1}$ and $S_{p2}$ are also in their short state, the current produced is actually $$I_{out}=n \times I_p=n \times (2 \times I_{ref}).$$

As will be apparent to those skilled in the art, this current source design can be modified to produce r×n currents by utilizing r current mirrors in the first mirror stage and n current mirrors in the second mirror stage.

In a preferred embodiment of the invention 10 current mirrors $I_1$, $I_2$, ..., $I_{10}$, are used in the second mirror stage, by utilizing 10 transistors $Q_1$, $Q_2$, ... $Q_{10}$ (and 10 switching devices $S_1$, $S_2$, ..., $S_{10}$) to obtain the following four currents:

$$I_1=I_{ref}, I_{10}=10 \times I_{ref}, I_2=2 \times I_{ref}, \text{ and}$$

$$I_{2a}=20 \times I_{ref}.$$

More particularly, the first current $I_1=I_{ref}$ is obtained when only $S^{p1}$ or $S_{p2}$, in the first mirror stage, and only one switching device $S_x$ ($1 \leq x \leq 10$), in the second mirror stage, are in a short state. The second current $$I_{1a}32\ 10 \times I_{ref}$$

is obtained by switching all the switching devices of the second mirror stage $S_1$, $S_2$, ..., $S_{10}$, and only one switching device from the first mirror stage, to a short state. The third current $$I_2=2 \times I_{ref}$$

can be obtained by switching two switching devices form the first mirror stage and one from the second mirror stage, or one from the first mirror stage and two from the second mirror stage, to their short state. The fourth current $$I_{2a}=20 \times I_{ref}$$

is obtained by switching all the switching devices in the first and the second switching stage to the short state.

Thus obtaining $$a=\frac{I_{1a}}{I_1}=\frac{I_{2a}}{I_2}=10$$

and $$b=\frac{I_2}{I_1}=2,$$

and consequently, $K=9.R_{eq}.I_{ref}=\Delta V_2-\Delta V_2=(V_{be2a}-V_{be2})-(V_{be1a}-V_{be1})$.(VII)

The expression obtained for the correction factor K in equation (VII) is of course simple to compute. This feature of the preferred embodiment of the invention is utilized for the realization of a simple temperature measurement device, as will be shown and explained with reference to FIG. 4A.

The measurement device shown in FIG. 4A comprises a control unit 401, an Up/Down (U/D) counter 402, a ΣΔ (SD) A/D converter 400, a selector device (MUX) 403, and a register 404.

The selector device 403 is used for loading an initial offset to the counter 402. This offset can be used to convert the temperature measurement from K° (absolute temperature—deg. Kelvin) to C° (deg. Centigrade), and for compensation of any other constant error that may be required. For example, the measurement process can include a step of loading the counter with an offset value, followed by four voltage measurements (e.g., steps 501 to 504), and the calculation of the correction factor (e.g., step 505). Next, the correction factor is loaded into register 404, which is then used to obtain a fixed result in the temperature measurements.

The SD converter 400 is preferably a ΣΔ modulator. In general it is an Analog to Digital circuitry capable of sampling its analog signal input at sampling frequencies much greater than the Nyquist frequency of the input signal, and capable of outputting a bit stream in which the density of '1's is proportional to the ratio of the analog signal input ($V_{in}$) and a reference signal ($V_{ref}$).

The input voltage measurement is achieved by accumulating the number of '1' outputs from the ΣΔ converter over a predetermined timeframe. The value of the $V_{ref}$ voltage input, the properties of the ΣΔ circuitry (e.g., capacitor ratios), and the integration period, can be used to define a 'gain' that is effectuated on the calculated result by the ΣΔ converter. In other words, the numeric value that represents each mili-Volt of the measured input can be adjusted according to specific design requirements, as described in "*Micropower CMOS Temperature Sensor with Digital Output*", by Anton Bakker and Joan H. Huijsing, IEEE Journal of Solid-State Circuits, Vol. 31, No. 7, July 1996.

The control unit can reset the counter content via its LOAD input, set the counter operation to UP or DOWN counting via the counter U/D input, and load an initial value into the counter via the counter Din input. The content of the counter can be initialized to a value loaded into the counter via its Din input. This value is obtained from register 404, the output of which is inverted. In this way the counter content can be initialized with the negation of the correction factor. It should be noted that for complete accuracy, there is a need to invert the correction factor bits and add a '1' to the counter. However, for the sake of simplicity, this action can be left out, since in most cases the temperature readouts are obtained by truncating the counter lower bits, so that the error caused by neglecting the addition of the 1 is negligible.

The counter operation is triggered by the SD converter 400 via its Enable input (E). Thus by providing the counter E input with the bit stream emanating from the SD converter 400 output over some predetermined time frame, the count result that is obtained in the counter is proportional to the input voltage signal Vin plus the value with which the counter is initialized with.

The control unit 401 is capable of setting the "time base" period at which the integration, performed by the U/D counter 402, is carried out. The time base can be used to define the gain of the circuit. In this way the counter output (Dout) can be multiplied by a constant, and thereby the value of the time base can be pre-set to obtain multiplication by the constant C $$\left(C = \frac{q}{k \cdot \eta \cdot lan(a)}\right)$$

as required for the calculation in equation VI above.

In general the SD converter 400 generates pulses with a rate which is equivalent to the ratio of $V_{in}$ to $V_{ref}$. These pulses are integrated over the "time base" by the U/D counter 402. By adjusting $V_{ref}$ properly and providing the voltage over the semiconductor junction ($V_{be}$) as input signal $V_{in}$, the computations of the correction factor and of the junction temperature are obtained.

The computation of the correction factor is obtained by performing two Up count operations (steps 421 and 423 in FIG. 4B) in the U/D counter 402, utilizing $V_{be2a}$ and $V_{be1}$ as input signals, to add together two voltage measurements. Similarly, by performing two Down count operations (steps 422 and 424 in FIG. 4B), utilizing $V_{be1a}$ and $V_{be2}$ as input signals, two voltage measurements are subtracted. Additionally, a fixed offset value can be added to the computation by setting the counter via the Din input, before starting the computation. For example, an offset of –273 can be used for converting the readout from degrees Kelvin to degrees Centigrade.

As was explained hereinabove, a gain can be set by changing the "time base". For example, by performing the integration performed by the counter 402 at ½ the time, the result obtained is scaled to ½ the original value. Thus, to obtain multiplication of the output by a constant value C, the ratio of the voltage signal inputs to the SD converter 400 and its internal integration time interval, and the "time base" period, should be pre-set correspondingly. In this way the calculated counter output value that is actually obtained is $C*\Delta V_1$ and $C*K$ (depending on the measurement that is being performed), and the readouts adjusted to be in deg. K° or C° (according to the specific design requirements).

The correction factor K should be calculated (step 442 in FIG. 4D) once every predetermined period of time, or alternatively, once every N predetermined number of temperature measurements. The process of calculating the correction factor is illustrated in FIG. 4B in a form of a flow chart. The process begins in step 420 in which the counter 402 is reset (loaded with a zero OFFSET value). The process proceeds in step 421 wherein a count UP operation is performed by the counter with an input voltage of $V_{in}=V_{be2a}$, that corresponds to current input $I=I_{2a}=20\times I_{ref}$.

In the next step 422 a count DOWN operation is performed by the counter with an input voltage of $V_{in}=V_{be2}$, that corresponds to current input $I=I_2=2\times I_{ref}$.

In steps 423 a count UP operation is performed by the counter with an input voltage of $V_{in}=V_{be1a}$, that corresponds to current input $I=I_1=I_{ref}$, and then in step 424 a count DOWN operation is performed by the counter with an input voltage of $V_{in}=V_{be1a}$, that corresponds to current input $I=I_{1a}=10\times I_{ref}$.

By adjusting properly the "time base" period, the result obtained in the counter after carrying out steps 421–424, is actually the correction K factor multiplied by the fixed gain C, $C.K=C.(V_{be1a}+V_{be2})-C.(V_{be2a}+V_{be1})$.

It should be noted steps 421≧424 can be performed in any order since the same result will be obtained.

The correction factor is stored in the register 404, and is used to initialize the counter content before each temperature measurement (step 443 in FIG. 4D), as shown in step 432 in FIG. 4C. The counter is initialized in step 431 with –K by using the inverted value of K ($\overline{K}$) obtained via register 404 output.

The measurement of the junction temperature is obtained by computing $T'=C.(\Delta V_1-K)$ (step 513 in FIG. 5B), where $$C = \frac{q}{k \cdot \eta \cdot lan(a)},$$

as shown in FIG. 4C. To perform this computation, in step 430, the "time base" in the control unit is adjusted to obtain a constant gain equivalent to C. The process proceeds in step 432 wherein –K is loaded into the counter 402, via register 404. Next, in step 433, count UP is performed with input signal $V_{in}=V'_{be1}$, which is the voltage measured over the semiconductor junction for junction current of $I=I_{1a}$.

In the next step, 434, count DOWN is performed with input signal $V_{in}=V_{be1}$, which is the voltage measured over the semiconductor junction for junction current of $I=I_1$.

The value obtained in the counter is $T'=C.(\Delta V'_1-K)$.

A process for measuring the correction factor and the semiconductor junction temperature is schematically illustrated in FIG. 4D. Measurement of the correction factor K, in step 442, is conducted once in a predetermined period of time, or alternatively after some predetermined number of temperature measurements 443 are performed. This decision is performed in step 441, according to a preferred policy, which may vary from one application to another. As shown in FIG. 4D, the semiconductor temperature measurement should be performed after the correction factor is measured at least once.

Although the present invention has been described with several embodiments, various changes and modifications may be suggested to one skilled in the art. It is intended that the present invention encompass such changes and modifications as fall within the scope of the appended claims.

What is claimed is:

1. A method, comprising:
   determining a temperature of a semiconductor junction using two or more voltage responses of the junction and a correction factor, the correction factor at least partially correcting for error in determining the temperature of the junction; and
   determining the correction factor based on two or more additional voltage responses by determining a first voltage difference between a first and a second additional voltage response;
   determining a second voltage difference between a third and a fourth additional voltage response; and
   determining a difference between the first and second voltage differences;
   converting the two or more additional voltage responses into two or more digital bit streams;
   determining the correction factor using the digital bit streams by:
      initializing a value in a counter;
      incrementing the value in the counter for each one value in the digital bit stream associated with the fourth additional voltage response;
      decrementing the value in the counter for each one value in the digital bit stream associated with the third additional voltage response;
      incrementing the value in the counter for each one value in the digital bit stream associated with the first additional voltage response; and
   decrementing the value in the counter for each one value in the digital bit stream associated with the second additional voltage response, the correction factor based on the value in the counter.

2. The method of claim 1, wherein:
   the two or more voltage responses comprise first and second voltage responses; and
   determining the temperature of the junction comprises:
      inverting the determined correction factor;
      loading the inverted correction factor into the counter;
      incrementing the value in the counter for each one value in a digital bit stream associated with the second voltage response; and
   decrementing the value in the counter for each one value in a digital bit stream associated with the first voltage response, the temperature based on the value in the counter.

3. The method of claim 1, wherein determining the temperature of the junction comprises determining the temperature of the junction using a formula of $T=C^*(V_2-V_1-K)$, where T represents the temperature of the junction, C represents a constant, $V_2$ represents a second of the voltage responses, $V_1$ represents a first of the voltage responses, and K represents the correction factor.

4. The method of claim 2, wherein determining the temperature of the junction comprises determining the temperature of the junction using a formula of $T=C^*(V_2-V_1-K)$, where T represents the temperature of the junction, C represents a constant, $V_2$ represents a second of the voltage responses, $V_1$ represents a first of the voltage responses, and K represents the correction factor.

5. The method of claim 1, wherein the error comprises error introduced by parasitic Ohmic resistances in the junction.

6. A method, comprising:
   determining a temperature of a semiconductor junction using two or more voltage responses of the junction and a correction factor, the correction factor at least partially correcting for error in determining the temperature of the junction; and
   determining the correction factor based on two or more additional voltage responses by determining a first voltage difference between a first and a second additional voltage response:
   determining a second voltage difference between a third and a fourth additional voltage response; and
   determining a difference between the first and second voltage differences, the correction factor based on the difference between the first and second voltage differences;
   converting the two or more additional voltage responses into two or more digital bit streams;
   determining the correction factor using the digital bit streams by:
      initializing a value in a counter;
      incrementing the value in the counter for each one value in the digital bit stream associated with the fourth additional voltage response; decrementing the value in the counter for each one value in the digital bit stream associated with the third additional voltage response;
      incrementing the value in the counter for each one value in the digital bit stream associated with the first additional voltage response; and
   decrementing the value in the counter for each one value in the digital bit stream associated with the second additional voltage response, the correction factor based on the value in the counter.

7. The method of claim 6, wherein:
   the two or more voltage responses comprise first and second voltage responses; and
   determining the temperature of the junction comprises:
      inverting the determined correction factor;
      loading the inverted correction factor into the counter;
      incrementing the value in the counter for each one value in a digital bit stream associated with the second voltage response; and
   decrementing the value in the counter for each one value in a digital bit stream associated with the first voltage response, the temperature based on the value in the counter.

8. The method of claim 6, wherein determining the temperature of the junction comprises determining the temperature of the junction using a formula of $T=C^*(V_2-V_1-K)$, where T represents the temperature of the junction, C represents a constant, $V_2$ represents a second of the voltage responses, $V_1$ represents a first of the voltage responses, and K represents the correction factor.

9. The method of claim 6, wherein the error comprises error introduced by parasitic Ohmic resistances in the junction.

* * * * *

UNITED STATES PATENT AND TRADEMARK OFFICE
CERTIFICATE OF CORRECTION

PATENT NO. : 7,170,275 B1
APPLICATION NO. : 11/085828
DATED : January 30, 2007
INVENTOR(S) : Ohad Falik It is certified that error appears in the above-identified patent and that said Letters Patent is hereby corrected as shown below:

Column 2, line 5, in the first listed equation, delete "$V_tV_f$" and replace with -- $V_f=V_f$ --;

Column 3, line 32, delete "$I_1I_{1a}$" and replace with -- $I_1/I_{1a}$ --;

Column 3, line 38, in the first listed equation, delete "$\Delta V_2$" and replace with -- $\Delta V_1$ --;

Column 3, line 58, in the fourth listed equation, delete "$\Delta V_2$" and replace with -- $\Delta V_1$ --;

Column 8, line 15, delete "$V'_{be1a}$" and replace with -- $V'_{be1} - V'_{be1}$ -- and delete "$I$." and replace with --$I_1$--;

Column 9, line 24, in the third listed equation, delete "$I_{10}$" and replace with -- $I_{1a}$ --;

Column 9, line 32, in the fifth listed equation, delete "32' and replace with -- = --;

Column 11, line 62, in the sixth listed equation, delete "$V_{be1a}$" and replace with -- $V_{be1}$ --;

Column 12, line 11, delete "421≥424" and replace with -- 421– 424--; and

Column 12, line 36, in the fifth listed equation, delete "$V'_{be1}$" and replace with -- $V'_{be1a}$ --.

Signed and Sealed this

Fourth Day of September, 2007

JON W. DUDAS
*Director of the United States Patent and Trademark Office*